United States Patent
Park et al.

[11] Patent Number: 5,808,788
[45] Date of Patent: Sep. 15, 1998

[54] OPTICAL FIBER AMPLIFIER

[75] Inventors: Chan-Sik Park, Gumi; Mi-Young Hong, Daegukwangyeok, both of Rep. of Korea

[73] Assignee: SamSung Electronics Co., Ltd., Kyungki-do, Rep. of Korea

[21] Appl. No.: 792,679

[22] Filed: Jan. 29, 1997

[30] Foreign Application Priority Data

Jan. 29, 1996 [KR] Rep. of Korea .................. 1996 1913

[51] Int. Cl.$^6$ ............................. H04B 10/17; G02B 6/36
[52] U.S. Cl. ......................... 356/341; 359/337; 359/339
[58] Field of Search .................... 359/337, 339, 359/341

[56] References Cited

U.S. PATENT DOCUMENTS

| | | | |
|---|---|---|---|
| 4,904,044 | 2/1990 | Tanulewich | 385/74 |
| 4,989,938 | 2/1991 | Tanulewich | 385/78 |
| 4,995,698 | 2/1991 | Nishimura et al. | 359/347 |
| 5,050,949 | 9/1991 | DiGiovanni et al. | |
| 5,177,634 | 9/1991 | DiGiovanni et al. | |
| 5,280,383 | 1/1994 | Federici et al. | |
| 5,317,660 | 5/1994 | Veith | |
| 5,327,282 | 7/1994 | Takeda et al. | |
| 5,343,320 | 8/1994 | Anderson | |
| 5,359,689 | 10/1994 | Iwatsuha et al. | 385/73 |
| 5,430,572 | 7/1995 | DiGiovanni et al. | |
| 5,434,701 | 7/1995 | Fatehi et al. | |
| 5,436,760 | 7/1995 | Nahabayashi | 359/341 |
| 5,453,827 | 9/1995 | Lee | 356/73.1 |
| 5,455,710 | 10/1995 | Takeda | |
| 5,490,101 | 2/1996 | Sharma et al. | |
| 5,491,581 | 2/1996 | Roba | |
| 5,500,915 | 3/1996 | Iwatsuka | 385/78 |
| 5,537,243 | 7/1996 | Fatehi et al. | |
| 5,566,018 | 10/1996 | Lee et al. | |
| 5,572,356 | 11/1996 | Yoshida et al. | |
| 5,675,683 | 10/1997 | Takabushki et al. | 385/78 |

FOREIGN PATENT DOCUMENTS

| | | |
|---|---|---|
| 0751637A2 | 1/1997 | European Pat. Off. |
| 6196788 | 9/1994 | Japan |
| 2295921 | 6/1996 | United Kingdom |
| 2298734 | 9/1996 | United Kingdom |
| 2309578 | 7/1997 | United Kingdom |

OTHER PUBLICATIONS

Verdiell et al, IEEE Photonics Letters, vol. 6, #8, Aug. 1994, pp. 960–962.

Nahagawa et al, pdp 11–1 through 1–3, N & T Transmission Systems Lap. Oct. 13, 1995.

Verdiell et al, Electronics Letters, vol. 29, #11, pp. 992–993, May 29, 1993; abstract only herewith.

Lach et al, Opt. Fiber Comm. Conf., Jan. 28, 1988, vol. 1, p. 163, abst. only herewith.

*Primary Examiner*—Nelson Moskowitz
*Attorney, Agent, or Firm*—Robert E. Bushnell, Esq.

[57] ABSTRACT

An optical fiber amplifier includes an optical filter, an optical isolator for blocking a reverse flow of a reflected light, the optical isolator including a lens coated with an integral filter having a predetermined bandwidth and an output end tab for monitoring the intensity of the output signal, the optical filter being coupled between the optical isolator and output end tab so as to only pass a specified wavelength band.

7 Claims, 3 Drawing Sheets

OPTICAL FIBER AMPLIFIER

CLAIM OF PRIORITY

This application makes reference to, incorporates the same herein, and claims all benefits accruing under 35 U.S.C. §119 from an application entitled Optical Fiber Amplifier earlier filed in the Korean Industrial Property Office on 29 Jan. 1996, and there duly assigned Ser. No. 1913/1996 by that Office.

BACKGROUND OF THE INVENTION

1. Field of the Invention

The present invention relates to an optical fiber preamplifier used for the receiving end of an optical transmission equipment, and more particularly to an optical fiber pre-amplifier having an optical filter so that the output wavelength coincides with the light source wavelength.

2. Description of the Related Art

Generally, an earlier optical fiber pre-amplifier used for the receiving end of the optical transmission equipment employs an optical filter to vary a light wavelength to a narrow band so that the output wavelength coincides with the light source wavelength.

Two previous methods have to be used for tuning the optical filter, one of which is the manual tuning method employing a spectrum analyzer, and the other is the automatic tuning(Auto-Tracking) method, whereby the optical filter wavelength is automatically adjusted to changes of the light source wavelength.

Recently, a fiber grating filter has been used with the optical fiber amplifier. When the above-noted optical fiber amplifier having the manually tuned built-in optical filter is installed in an optical transmission network, the signal wavelength band of the optical transmitter is measured and adjusted to the optical filter wavelength. Furthermore, the above-noted automatic tracking method is a method by which the light source wavelength is recognized by the optical fiber amplifier and the optical filter wavelength band is automatically adjusted to the light source wavelength, which is in practice difficult to be materialized, and an optical fiber amplifier employing such an automatic tracking method has not been produced on a commercial scale.

Furthermore, the optical fiber grating filter is manufactured to have the characteristics to reflect or to remove only the light of a specified wavelength by passing the strong and short laser beam through the tiny apertures of the optical fiber grating. Such an optical fiber grating filter employs the characteristics of the optical fiber core composed partially of germanium which strongly absorbs ultraviolet rays, whereby if the germanium is exposed to the interference pattern-like laser beam, the light refractive index within the fiber core is changed, and hence the gratings are formed within the core itself, thereby serving as filter.

An earlier optical fiber preamplifier using an optical filter of a narrow wavelength band included an input end-tab for receiving an optical signal from an optical transmitter, a first optical isolator, an optical wavelength coupler, an optical fiber filled with erbium of a rare earth element, a second optical isolator, a photoelectric converter, a pumping light source, an automatic tuner and an electrical circuit, a pumping light source driver and supervisory circuit, a photoelectric converter, an optical filter and an output end-tab.

Such an optical fiber amplifier using an optical filter of a narrow wavelength band can not maintain the wavelength band of the optical filter for a long time.

In addition, since the wavelength of the light source changes greatly, the earlier narrow band wavelength method is unsuitable for optical communication networks requiring long-term reliability and the implementation method thereof becomes very complicated. Namely, such a method has a problem in that the central wavelength value of the narrow band optical filter must be passively or automatically adjusted to the central wavelength of the light source of the optical transmitter. Moreover, the automatic tracking method for automatically adjusting the wavelength band is difficult to accommodate and a transmission equipment package of high density because the size of the tunable optical filter equipment is relatively large and in order to be automatically adjusted to the wavelength of the light source, the tunable optical filter uses a small rotation motor and the nonconformity of the wavelength value due to the deterioration of the optical filter itself and the fine changes of the optical filter's wavelength due to the changes of the adjusting value of the electrical circuit driving the above-noted rotation motor undesirably affecting long term reliability.

The above-noted optical fiber grating filter employs the characteristics of the optical fiber core composed partially of germanium which strongly absorbs ultraviolet rays, whereby if the germanium is exposed to the interference pattern-like laser beam, the light refractive index within the fiber core is changed, and hence the gratings are formed within the core itself, thereby serving as filter. Consequently, reflection and crosstalk losses are caused, and the germanium undergoes secondary diffusion by the high-performance pumping light source, thereby resulting in deterioration of the initial function of the narrow band optical filter for the long run.

The following patents disclose earlier optical fiber amplifiers.

| Patent No. | Inventor | Date |
| --- | --- | --- |
| 5,327,282 | Takeda et al. | 7/5/94 |
| 5,430,572 | DiGiovanni et al. | 7/4/95 |
| 5,343,320 | Anderson | 8/30/94 |
| 5,491,581 | Roba | 2/13/96 |
| 5,537,243 | Fatehi et al. | 7/16/96 |
| 5,050,949 | DiGiovanni et al. | 9/24/91 |
| 5,280,383 | Federici et al. | 1/18/94 |
| 5,434,701 | Fatehi et al. | 7/18/91 |
| 5,455,710 | Takeda | 10/3/95 |
| 5,490,010 | Sharma et al. | 2/6/96 |
| 5,566,018 | Lee et al. | 10/15/96 |
| 5,572,356 | Yoshida et al. | 11/5/96 |

The patent to Federici et al. '383 discloses an optical amplifier arrangement having a filtering device 16 disposed between an isolator 15 and a post amplifier stage 17. As noted in the paragraph beginning on line 35 of column 2 of Federici et al. '383, the filtering device has a bandwidth of 10 nm as opposed to the 20 nm of the filter 5 of the present invention. The patent to DiGiovanni et al. '949 discloses filter 36 disposed between an isolator 34 and a coupler 28. The amplifier appears to operate at a similar frequency to that of the present invention but it is unclear from the disclosure of DiGiovanni et al. '949 as to what the bandwidth of the filter 36 is.

The patent to Fatehi et al. '243 discloses a flip-flop arrangement containing two optical fiber amplifiers having bandpass filters connected to their output. It is unclear from the disclosure of Fatehi et al. '243 as to the bandwidth of the bandpass filters.

FIG. 5 of the patent to Roba '581 illustrates a fiber optical amplifier 52 having an output connected to an isolator 66 which is subsequently connected to a filter 68. It is unclear as to what the bandwidth of the filter is.

FIG. 2 of the patent to Anderson '320 illustrates an optical fiber amplifier 24 having an output connected to an isolator 52 which is subsequently connected to a filter 54. The bandwidth of the filter 54 does not appear to be disclosed.

The patent to DiGiovanni et al. '572 teaches the use of an isolator 35 connected to a bandpass filter 55 disposed between two optical fiber amplifiers 40 and 50. As with many of the cited patents, it is unclear from the disclosure as to the actual bandwidth of the bandpass filter. FIG. 4 of the patent to Takeda et al. '282 illustrates a filter 36 connected to an output of an optical fiber amplifier 35 which is in turn connected to an isolator 37. In the paragraph beginning on line 7 of column 5 of Takeda et al. '282, it is indicated that the optical filter 36 may be formed as a dielectric multilayer film on an interface of an optical fiber or a transparent glass substrate. The actual bandwidth of the filter does not appear to be noted in the specification.

The remaining patents each disclose features in common with the present invention but are not believed to be as pertinent as the references discussed above.

SUMMARY OF THE INVENTION

Accordingly, an object of the present invention is to provide an optical fiber amplifier having an optical filter which minimizes the wavelength transition, thereby improving the reliability thereof.

It is another object of the present invention to provide an optical fiber amplifier having an optical filter which minimizes power consumption and performs stable operation.

According to the present invention, there is provided an optical fiber amplifier, which comprises an optical filter, an optical isolator for blocking a reverse flow of a reflected light, the optical isolator including a lens coated with an integral filter having a predetermined bandwidth and an output end tab for monitoring the intensity of the output signal, the optical filter being coupled between the optical isolator and output end tab so as to only pass a specified wavelength band.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
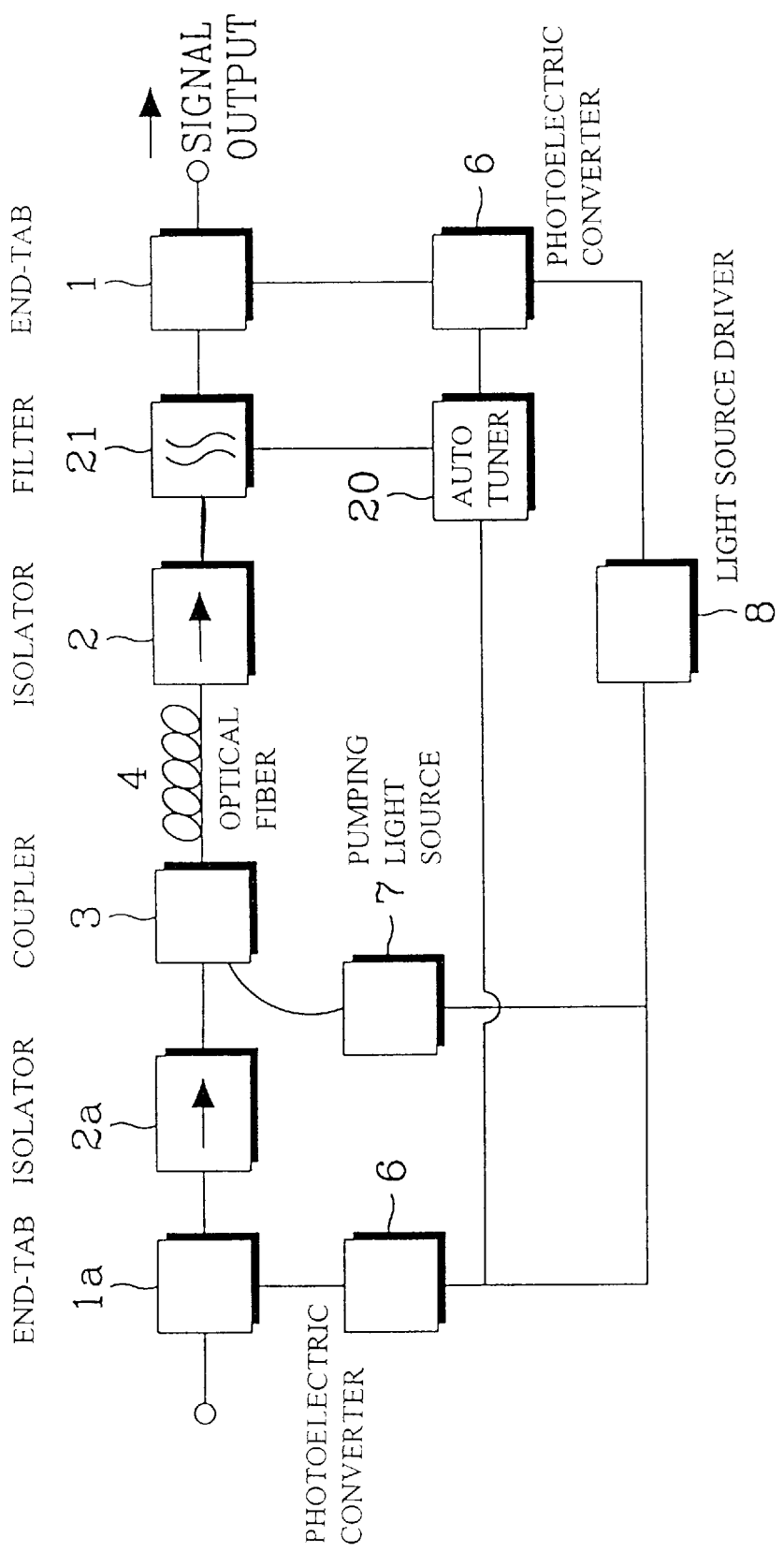
FIG. 1 is a block diagram illustrating an earlier front end optical fiber amplifier using an optical filter of a narrow wavelength band.

FIG. 1 illustrates an earlier optical fiber pre-amplifier using the optical filter of the narrow wavelength band. Referring to FIG. 1, the optical fiber pre-amplifier comprises an input end-tab 1a for receiving an optical signal from an optical transmitter (not shown), a 1st optical isolator 2a, an optical wavelength coupler 3, an optical fiber filled with erbium of a rare earth element 4, a 2nd optical isolator 2, a photoelectric converter 6, a pumping light source 7, an automatic tuner and electrical circuit 20, a pumping light source driver and supervisory circuit 8, a photoelectric converter 6, an optical filter 21 and an output end-tab 1.

Such an optical fiber amplifier using the optical filter 21 of a narrow wavelength band can not maintain the wavelength band of the optical filter for a long time, and there appears rather the phenomenon of a wavelength transition to nm grade.

In addition, since the wavelength of the light source in itself changes greatly, the earlier narrow wavelength band method is unsuitable for optical communication networks requiring long-term reliability, and the implementation method thereof becomes very complicated. Namely, such a method has a problem in that the center wavelength value of the narrow band optical filter must be passively or automatically adjusted to the center wavelength of the light source of the optical transmitter. Moreover, the automatic tracking method for automatically adjusting the wavelength band is difficult to accommodate in a transmission equipment package of high density because the size of the tunable optical filter equipment is greater than that of the EDFA module, because in order to be automatically adjusted to the wavelength of the light source, the tunable optical filter uses a small rotation motor, and the nonconformity of the wavelength value due to the deterioration of the optical filter itself and the fine changes of the optical filter's wavelength due to the changes of the adjusting value of the electrical circuit driving the above noted rotation motor undesirably affect the long-term reliability. Furthermore, as for a tunable Fabry-Perot etaol filter which operates based on the principle of a low voltage piezoelectric actuator, the amplification gain characteristics of the optical fiber amplifier changes if the output wavelength is finely changed depending upon the voltage changes of the electrical circuit due to the electrical hysteresis phenomenon.

Figure 2:
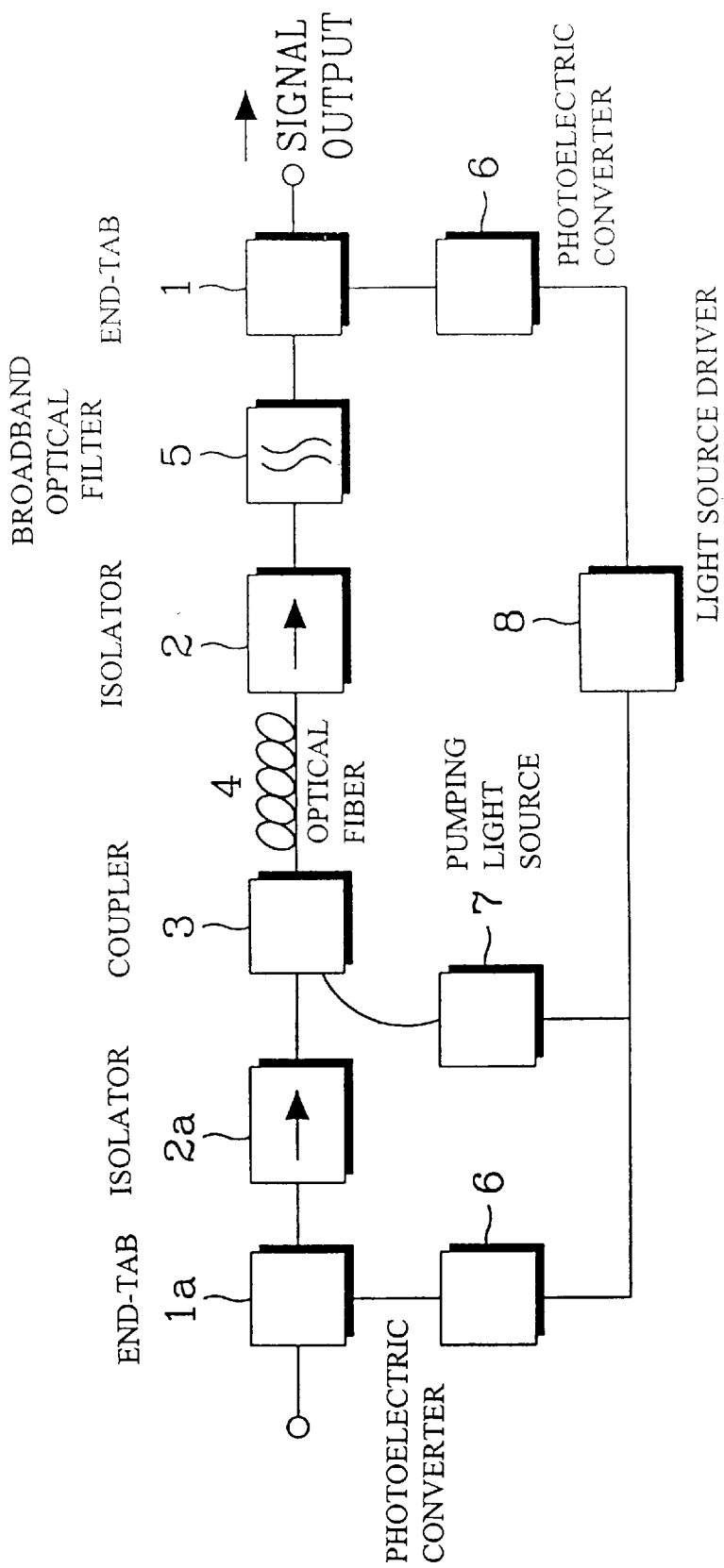
FIG. 2 is a constitutional block diagram illustrating a novel front end optical fiber amplifier using an optical filter of a broad wavelength band according to the present invention.

Referring to FIG. 2, the optical fiber pre-amplifier comprises an input end-tab 1a, a 1st optical isolator 2a, an optical wavelength coupler 3, an optical fiber filled with erbium of a rare-earth element 4, a 2nd optical isolator 2, a photoelectric converter 6, a pumping light source 7, a pumping light source driver and supervisory circuit 8, a broadband optical filter 5 and an output end-tab 1.

The broadband optical filter 5 may be mounted in the optical fiber amplifier as an in-line type which is fused so as to be joined between the optical isolator 2 and the optical tab 1, or the lens of the optical isolator 2a may be coated with the interference optical filter material, whereby a multifunctional component part which performs both the functions of the optical filter and the optical isolator is manufactured and installed into the optical fiber amplifier.

An optical filter is designed to pass wavelengths of 1530 nm–1560 nm, applied to the optical fiber amplifier, which may be used as an optical fiber pre-amplifier, so that it may be used independently of the wavelength of the light source at a transmitter.

The above optical fiber amplifier employs the broadband interference filter, thereby amplifying the optical signals of the wavelength range of 1540 nm–1560 nm and removing the ASE signals with high amplification of the wavelength of 1520 nm–1540 nm, which consequently facilitates communications.

Figure 3:
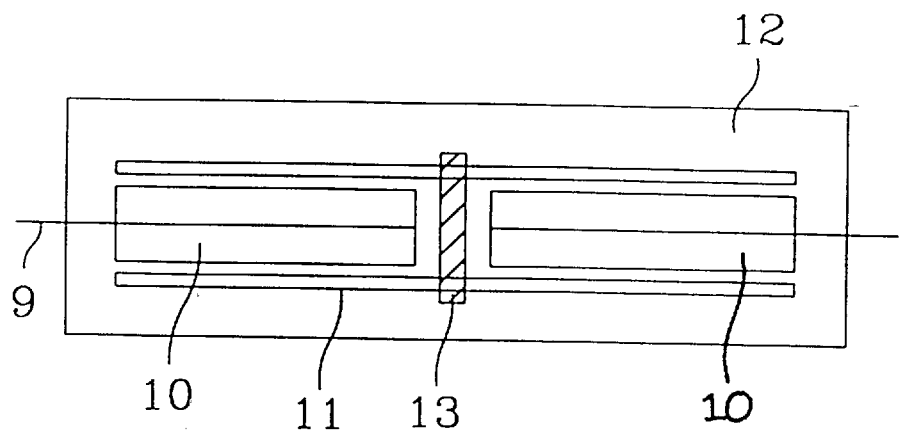
FIG. 3 is a schematic diagram for illustrating the construction of an in-line broadband optical filter according to the present invention.
Figure 4:
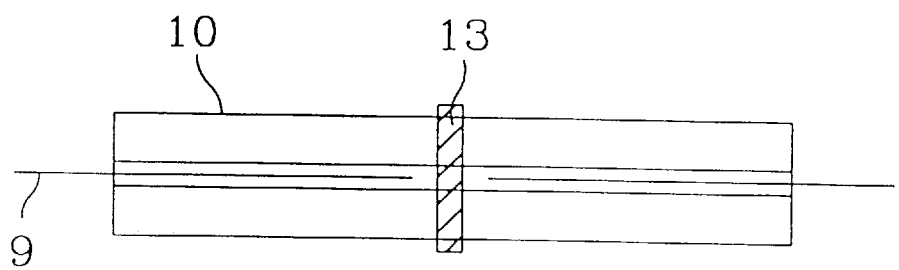
FIG. 4 is a schematic diagram for illustrating the construction of an in-line broadband optical filter according to another embodiment of the present invention.

Referring to FIGS. 3 and 4, the broadband optical filter 5 of FIG. 3 is installed within the front-end optical fiber amplifier. The optical filter 13 has a polymer film forming the broadband filter coating, so that an optical signal having the wavelength of 1540–1560 nm can be passed.

After the optical filter 13 is inserted between two optical ferrules 10 connected to each other by one sleeve 11, the alignment of the optical axis is performed and then the broadband optical filter is packaged into the body 12. Alternatively, the broadband filter 13 of a film type may be built into the center of the optical ferrule 10.

When employing the broadband optical filter, the amplification efficiency of the optical pre-amplifier is inferior to that of a pre-amplifier employing a narrow band optical filter. However, even when employing the narrow band optical filter, the signal output must be adjusted to the performance of the light receiving element at the receiving end of the transmission equipment by reducing the amplification gain of a strong signal output by means of the attenuator of a +10 dBm level. Accordingly, the amplification efficiency is insignificant, and the tunable wavelength band of the narrow band optical filter can be adjusted to the light source by employing the broadband optical filter, so that the reliability of the optical filter can be improved. Additionally, the power consumption of the automatic tuning device and electrical circuit of the narrow band optical filter is greatly reduced, and the electrical circuit of the optical fiber amplifier is simplified, thus improving the circuit stability.

What is claimed is:

1. An optical fiber amplifier comprising an optical filter, an optical isolator for blocking a reverse flow of a reflected light, said optical isolator including a lens coated with an integral filter having a predetermined broad bandwidth and an output end tab for monitoring the intensity of the output signal; said optical filter being coupled between said optical isolator and output end tab so as to only pass a specified broad wavelength band.

2. An optical fiber amplifier as defined in claim 1, said specified broad wavelength band being in the range of 1540 mn–1560 nm.

3. An optical fiber amplifier as defined in claim 1, said optical filter being a broad band interference coated filter.

4. An optical fiber amplifier as defined in claim 1, said optical filter being inserted between an optical ferrule and a sleeve.

5. An optical fiber amplifier as defined in claim 1, said optical filter being inserted into a groove provided in a ferrule.

6. An optical fiber amplifier as defined in claim 1, said optical isolator having a lens coated with a filter having a bandwidth of 20 nm so as to have both functions of a broad band optical filter and an optical isolator.

7. An optical fiber amplifier as defined claim 1, said optical filter being directly coated on a section of an optical ferrule.

* * * * *